March 31, 1959 C. J. STIPEK 2,879,946
SELF-PROJECTABLE AND RETRACTABLE SPRINKLER HEADS
Filed Jan. 9, 1957
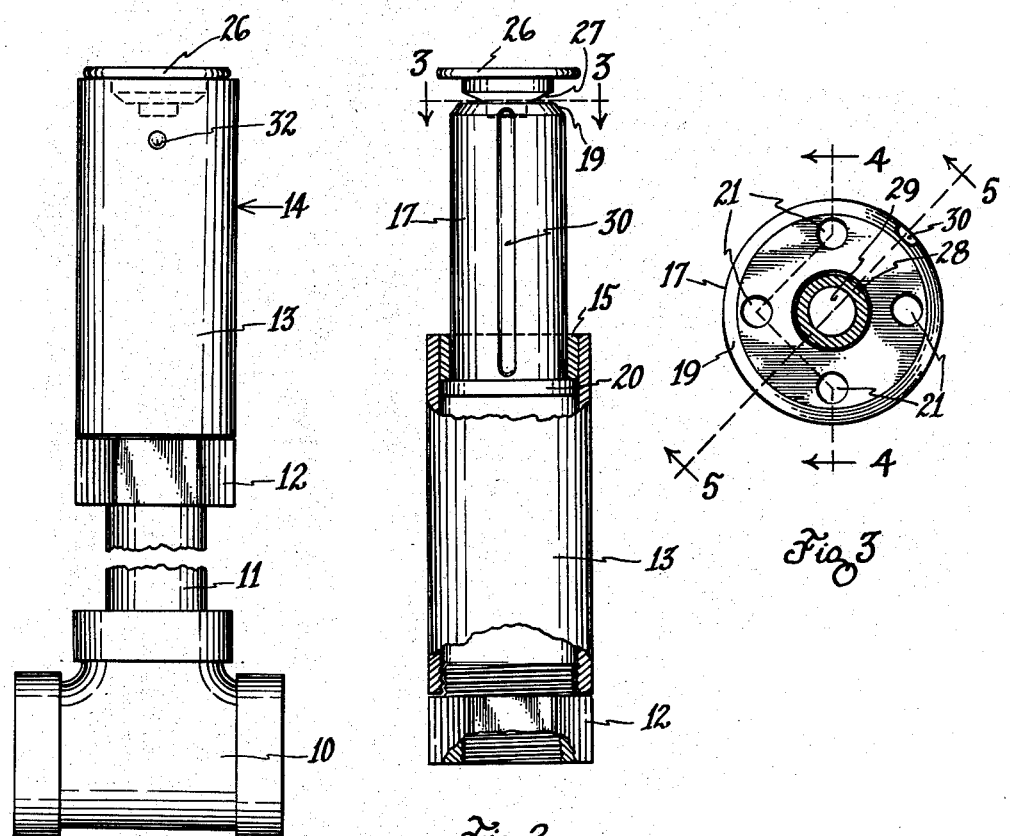
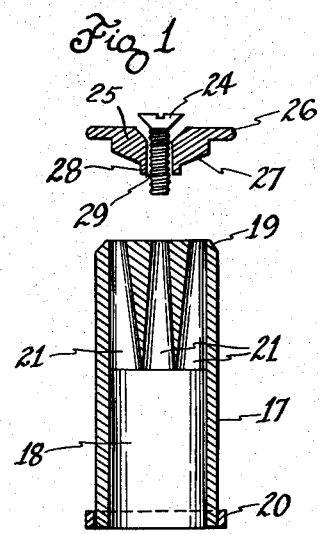
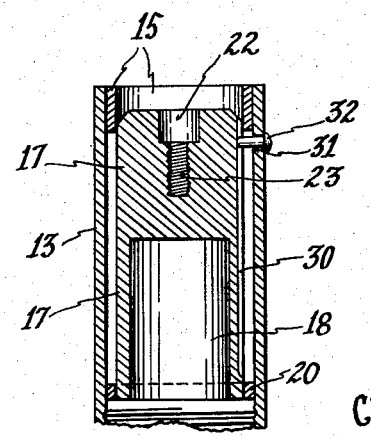
INVENTOR.
Charles J. Stipek
BY John F. Brezina
Atty United States Patent Office 2,879,946
Patented Mar. 31, 1959

2,879,946
SELF-PROJECTABLE AND RETRACTABLE SPRINKLER HEADS

Charles J. Stipek, St. Joseph, Mich.

Application January 9, 1957, Serial No. 633,259

5 Claims. (Cl. 239—204)

My invention is directed to novel lawn type sprinkler heads and to a novel system and construction adapted to be preferably installed underground for automatic sprinkling of lawns, gardens and the like.

It is an important object of my invention to provide spray heads of novel construction which are easy to install and in which portions thereof are slidably mounted and adapted to be projected by water pressure above the normal lawn grass and which will be returned by gravity when water pressure is absent to a level substantially equal with the ground and to thereby avoid tripping of persons.

It is a further object of my invention to provide projectable telescopic spray-heads which are so constructed that the minimum amount of friction is encountered in the projecting and retracting movements and which will not rust or clog or become inoperative due to action of water, air and mineral particles in the water.

It is a further object of my invention to provide aforesaid spray-heads which have tapered gradually reduced water outlet passages to increase the pressure of the water emitted therefrom, and to utilize a reduced volume of water to wet a given area.

It is a further object of my invention to provide novel spray-heads having manually adjustable water deflecting and spreading valve members which will spray the water on substantially square areas of the lawn or ground and which break up the water to a greater degree into fine particles or mist.

It is a still further object of my invention to provide a novel construction of receiving chambers in which the spray-heads are slidably mounted with respect to relatively small bearing areas and in which the major portion of the walls of the slidable spray-heads are spaced from the walls of such receiving chambers.

It is a still further object of my invention to provide easily installable spray-heads which when in non-operative positions are not visible to viewers at reasonable distances and which will efficiently operate with a wide range of water pressures.

Other and further important objects of my invention will be apparent from the following description and appended claims.

On the drawings:

Fig. 1 is a side elevational of my novel sprinkler head, illustrated as mounted in a conventional T forming a part of the underground supply pipe system.

Fig. 2 is an elevation, with parts broken away, and with certain parts in section, of one of my spray-heads and its housing.

Fig. 3 is an enlarged top plan view of the upper end of the body of the spray-head and taken on line 3—3 of Fig. 2.

Fig. 4 is a cross sectional view of the projectable head taken substantially along line 4—4 of Fig. 3.

Fig. 5 is a cross section of the projectable head taken substantially along line 5—5 of Fig. 3.

Numeral 10 designates a conventional metal T to which are connected water supply pipes of an underground automatic lawn sprinkling system. Such ground-installed systems have a plurality of spaced apart normally parallel pipes connected to one or more common supply headers. Such headers are connected by suitable piping to a supply of water under pressure which in some cases is a separate pressure booster pump which, when operated, is adapted to maintain the water in the underground piping at increased pressure as compared to the local water pressure of the community.

Such T's 10 and the branch pipe lines containing such T's are spaced apart to a degree that the water expelled through sprinkler heads connected to such T's will fall upon the entire area desired to be intermittently sprinkled.

The branch water supply pipes and their respective T's 10, along with parts connected to said T's, are buried a short distance below the ground level and preferably below the normal area of growth of grass roots. It is a great advantage of my invention to install substantially all of my sprinkler heads below ground level with the upper end portion of the spray-heads on the same level or plane as the adjacent ground so that such heads do not obstruct lawn mowers and are not a means of tripping persons and are not normally visible when the grass is at average height.

Numeral 11 designates a metal nipple threaded into the upper opening of T 10 and on the upper end thereof a metal nut or bushing 12 is securely threaded, as illustrated in Fig. 1. Bushing 12 forms a part of cylindrical housing 14 and it has a reduced threaded portion which is threadingly mounted in the lower threaded end of the cylinder 13 of housing 14, as illustrated in Fig. 2.

As illustrated in Figs. 2 and 5, there is mounted in the upper end of cylinder 13 a metal sleeve or collar 15 which is preferably set by pressing the same thereinto to a tight fit. Such sleeve 15 is preferably of stainless steel to reduce friction of its inner bearing face, or same may be of other non-corrosive metal.

Referring to Figs. 2, 3, 4, and 5, numeral 17 designates a spray-head which is preferably of substantially cylindrical shape and of suitable non-corrosive metal and of a circumference smaller than the inside dimension of the main portion of housing 14. Said spray-head 17, which is shown in vertical section in Fig. 4 and in top plan view in Fig. 3, has a hollow cylindrical chamber 18 and an upper beveled peripheral edge 19. Said spray-head carries on its lower end a collar or ring 20 which is preferably of stainless steel to minimize friction, as shown in Figs. 2, 4 and 5.

The outer circumference of ring 20 is such as to slidably fit into the cylindrical housing, as illustrated in Figs. 2 and 5, and this with very little friction so that water pressure will raise, telescope and project said spray-head to positions such as shown in Fig. 2, and so that said spray-head will retract and fall by gravity when water pressure is terminated. Said ring may optionally be formed integral with spray-head 17 though I prefer to press-fit the same thereon. The initial water pressure raises the spray-heads substantially to positions as illustrated in Fig. 2.

As illustrated in Fig. 5, a recess 22 is formed centrally in the upper end portion of spray-head 17 and an internally threaded bore 23 is formed concentrically with said recess 22 which is adapted to receive the threaded adjusting screw 24 which is loosely mounted in and extends through the central passage 29 of valve member 25. Valve member 25 is preferably annular and has an upper flat face defined by flange 26 and it has an intermediate body which has a downward conical face 27 and an annular integral flange which forms a central nipple 28 which normally seats in recess 22. It will be noted that an annular groove is formed between flange 26 and conical face 27, as illustrated in Fig. 4.

The passage 29 is of greater diameter than the screw 24 so that valve member 25 will be moved upwardly by water pressure to the limit permitted by the head of screw 24 so that the annular orifice through which the water is expelled upwardly and radially may be increased or decreased according to the pre-set position of said screw 24.

As shown in Figs. 2 and 5, the movable spray-head has a longitudinal groove 30 formed therein which terminates inward of the ends thereof. A hole 31 is formed in cylinder 13 at a point a short distance inward of its upper end as shown in Fig. 5. A pin or plug 32 is mounted in said hole 31 preferably by sweating in and friction, and extends inwardly only a short distance so that its inner end does not impinge on slidable head 17 so that said pin 32 will extend into the groove 30 to thereby limit the upward projection of head 17 through engagement of said pin with the end of said groove. Such slidable engagement of said pin 32 in groove 30 also prevents rotation of said head which normally would be caused by water pressure. This maintains the outlets of the spray-head in the same positions and causes the water outlets and valve member to always spray water on the same substantially square area of the lawn or garden. By proper spacing of the spray-heads when installation is made, based upon the available water pressure, the distance between adjacent spray-heads will be such that water from two or more adjacent spray-heads will not "overlap" or fall on the same area, and consequently no water is wasted and uniformity of wetting is accomplished.

My novel construction described in the foregoing and herein claimed provides the afore-described advantages and ground-installed sprinkling systems which are easy to install and require no maintenance and which will operate efficiently for very long periods of time with the minimum consumption of water.

Inasmuch as many changes could be made in the foregoing construction and as many variations could be proposed in the specification and claims without departing from the scope and spirit thereof, it is intended that all matter contained herein shall be considered as illustrative and not in a limiting sense.

I claim:

1. In an adjustable spray-head for lawn sprinkler systems a metal cylindrical housing having a threaded bushing on the lower end thereof adapted to be connected with underground water supply pipes; a metal spray-head slidably mounted in said housing having a substantially flat, circular upper end surface and having a plurality of circumferentially-spaced, elongated passages extending therethrough and opening in said circular upper end surface; an inner ring on the upper end of said housing adapted to slidably engage the exterior face of said spray-head; a metal ring on the lower end of said head adapted to slidably engage the interior face of said housing; an annular valve member mounted on said head for vertical sliding movement with respect thereto, said valve member being slidable with respect to said spray-head between a retracted position wherein an annular portion thereof abuts said spray-head upper end surface and a projected position wherein the annular portion of said valve member is moved away from said spray-head upper end surface, said valve member having an annular, tapered surface facing downwardly and outwardly and substantially in vertical alignment with the openings of said passages in said spray-head upper end surface adapted to deflect water radially outwardly, said spray-head being adapted to be telescoped upwardly and said valve member being slidable to its projected position by water pressure to maintain said head and valve member substantially above the upper end of said housing during maintenance of water pressure; and adjustable stop means for limiting sliding movement of said valve member away from said spray-head upper end surface.

2. In a spray-head for underground lawn sprinkler systems, a cylindrical housing adapted to be communicatively connected to underground pipes of said systems and adapted to be mounted below the ground surface; a cylindrical spray-head slidably mounted in said housing, said spray-head having a substantially flat upper end surface, said spray-head being slidable from a lowered position and an elevated position wherein said upper end surface is above the ground surface by water pressure, said spray-head having a plurality of circumferentially-spaced passages extending therethrough and opening into said upper end surface; a valve member vertically slidably mounted on the upper end of said spray-head having an annular, tapered surface substantially in vertical alignment with said openings of said passages in said spray-head upper end surface whereby water flowing vertically from said openings is deflected radially outwardly; and adjustable stop means for varying the amount of sliding movement permitted between said valve member and said spray-head.

3. In a spray-head as recited in claim 2, and wherein said housing has a pin mounted in and projecting inwardly from its side wall, and wherein said spray-head has a longitudinal groove therein, said pin extending into said groove to prevent relative rotation between said housing and spray-head.

4. In a spray-head as recited in claim 2, and wherein said valve member has an annular flange extending radially from said annular tapered surface adapted to engage the upper end of said housing when said spray-head is in its lowered position, and wherein said passages in said spray-head are gradually reduced in cross sectional area toward their upper ends to thereby increase the pressure of water passing out of said openings.

5. In a spray-head for underground water systems and the like adapted to be mounted with its upper portion substantially at ground level; a metal cylinder; means mounted on one end of said cylinder for connecting said cylinder to a water supply pipe; a spray-head having a sliding fit with said cylinder and adapted to be projected therefrom by water pressure, said spray-head having a central recess in its upper end portion and a threaded passage concentric with said recess, said spray-head having a plurality of circumferentially-spaced elongated passages extending therethrough, said passages being radially spaced from said central recess and opening in the uppermost surface of said spray-head; a valve member vertically slidably mounted on the upper end of said head and having an annular tapered surface in vertical alignment with said elongated passages adapted to deflect water radially outwardly, said valve member being centrally passaged and having a depending annular lip adapted to slidably engage the surface of said spray-head defining said recess of said spray-head; and a screw extending loosely through said passage of said valve member and in threaded engagement with the threaded passage of said spray-head, said screw having an enlarged head disposed outwardly of said valve member and incapable of passing through the passage thereof whereby the position of said valve member with respect to said spray-head may be varied to adjustably limit sliding movement of said valve member with respect to said spray-head.

References Cited in the file of this patent

UNITED STATES PATENTS

| | | |
|---|---|---|
| 1,492,941 | Sherman | May 6, 1924 |
| 1,801,524 | Munz | Apr. 21, 1931 |
| 1,847,921 | Bowers | Mar. 1, 1932 |
| 2,125,863 | Arbogast | Aug. 9, 1938 |
| 2,619,378 | Watkins | Nov. 25, 1952 |
| 2,796,293 | Becker | June 18, 1957 |
| 2,812,977 | Phillips | Nov. 12, 1957 |